US009324136B2

(12) United States Patent
Chang et al.

(10) Patent No.: US 9,324,136 B2
(45) Date of Patent: Apr. 26, 2016

(54) METHOD, ELECTRONIC APPARATUS, AND COMPUTER READABLE MEDIUM FOR PROCESSING REFLECTION IN IMAGE

(71) Applicant: HTC Corporation, Taoyuan County (TW)

(72) Inventors: Ruey-Jer Chang, Taoyuan County (TW); Lun-Cheng Chu, Taoyuan County (TW); Wei-Chung Yang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/302,446

(22) Filed: Jun. 12, 2014

(65) Prior Publication Data
US 2015/0363920 A1 Dec. 17, 2015

(51) Int. Cl.
*H04N 5/217* (2011.01)
*H04N 5/232* (2006.01)
*H04N 5/235* (2006.01)
*H04N 5/243* (2006.01)
*G06T 5/00* (2006.01)
*G06T 5/50* (2006.01)

(52) U.S. Cl.
CPC . *G06T 5/005* (2013.01); *G06T 5/50* (2013.01); *H04N 5/217* (2013.01); *H04N 5/2351* (2013.01); *H04N 5/23229* (2013.01); *H04N 5/243* (2013.01); *G06T 2207/10004* (2013.01); *G06T 2207/20172* (2013.01); *G06T 2207/30168* (2013.01)

(58) Field of Classification Search
CPC . H04N 5/243; H04N 5/2351; H04N 5/23229; H04N 5/217; G06T 5/50; G06T 5/005; G06T 2207/20172

USPC ................. 348/241, 234–236, 169–172, 248, 348/396.1, 222; 382/181, 190, 118, 103, 382/209, 254; 340/541
See application file for complete search history.

(56) References Cited

U.S. PATENT DOCUMENTS

| 2002/0051057 | A1* | 5/2002 | Yata | G06T 7/2033 348/142 |
| 2012/0050074 | A1* | 3/2012 | Bechtel | B60R 1/04 340/988 |
| 2012/0075432 | A1* | 3/2012 | Bilbrey | G01J 4/00 348/48 |
| 2012/0241597 | A1* | 9/2012 | Bridge | H04N 5/2351 250/208.1 |

FOREIGN PATENT DOCUMENTS

| CN | 102401647 | 4/2012 |
| CN | 203587517 | 5/2014 |

* cited by examiner

*Primary Examiner* — Tuan Ho
*Assistant Examiner* — Marly Camargo
(74) *Attorney, Agent, or Firm* — Jianq Chyun IP Office

(57) ABSTRACT

A method, an electronic apparatus, and a computer readable medium for processing reflection in an image are proposed. In the method, a first image and a second image are obtained. A plurality of objects in the first image and the second image are recognized and a plurality of lighting regions having a brightness higher than a first threshold in the first image and the second image are detected. Then, a plurality of displacements between corresponding objects and corresponding lighting regions in the first image and the second image are calculated. It is determined whether a ratio of the displacement of the object nearby one of the lighting regions to the displacement of the lighting region is over a second threshold. Finally, the lighting region is determined as a reflection if the ratio is over the second threshold.

13 Claims, 4 Drawing Sheets (a)

(b)

(a)

(b)

METHOD, ELECTRONIC APPARATUS, AND COMPUTER READABLE MEDIUM FOR PROCESSING REFLECTION IN IMAGE

BACKGROUND

1. Field of the Invention

The application relates to an image processing method, and in particular, to a method and an electronic apparatus for processing reflection in an image.

2. Description of Related Art

As digital cameras and consumer electronics equipped with an image capturing system has become more and more popular in the current market, the quality of images captured thereby and the applications for modifying the images have become one of the most important factors that the consumer considers in purchasing related products. Accordingly, various image processing algorithms are developed to improve the image quality, and one of which is related to noise reduction. The noise existed in the captured images can be classified into three categories, including: (i) noise generated by the image capturing system itself; (ii) noise generated by variations or changes in the medium interposed between the object being captured and the image sensor of the image capturing system; and (iii) noise generated by reflection or interference of nearby objects. The noise may cause the images to be blurred, dimed, or even deformed, which seriously affect the image quality.

Therefore, how to effectively reduce the noise in the images has become one of the important issues in the image processing field.

SUMMARY

Accordingly, the application provides a method, an electronic apparatus, and a computer readable medium for processing reflection in an image, which may recognize and remove the reflections generated in the images captured by the electronic apparatus.

The application provides a method for processing reflection in an image, adapted for an electronic apparatus. In the method, a first image and a second image are obtained. A plurality of objects in the first image and the second image are recognized and a plurality of lighting regions having a brightness higher than a first threshold in the first image and the second image are detected. Then, a plurality of displacements between corresponding objects and corresponding lighting regions in the first image and the second image are calculated. It is determined whether a ratio of the displacement of the object nearby one of the lighting regions to the displacement of the lighting region is over a second threshold. Finally, the lighting region is determined as a reflection if the ratio is over the second threshold.

The application provides an electronic apparatus for processing reflection in an image. The electronic apparatus includes an image retrieving unit, a storage unit, and a processing unit. The image retrieving unit is used to obtain a first image and a second image. The storage unit is used to store information comprising program routines, which comprise an object recognizing module, a detecting module, a displacement calculating module, and a reflection determining module. The object recognizing module recognizes a plurality of objects in the first image and the second image. The detecting module detects a plurality of lighting regions having a brightness higher than a first threshold in the first image and the second image. The displacement calculating module calculates a plurality of displacements between corresponding objects and corresponding lighting regions in the first image and the second image. The reflection determining module determines whether a ratio of the displacement of the object nearby one of the lighting regions to the displacement of the lighting region is over a second threshold and determines the lighting region is a reflection if the ratio is over the second threshold. The processing unit is coupled to the image retrieving unit and the storage unit for controlling the execution of the program routines.

The application provides a non-transitory computer readable medium, which records a computer program to be loaded into an electronic apparatus to execute the aforementioned method. The computer program is composed of a plurality of program instructions (for example, an organization chart establishing program instruction, a table approving program instruction, a setting program instruction, and a deployment program instruction, etc), and these program instructions are loaded into the electronic apparatus and executed by the same to accomplish various steps of the method for processing reflection in an image.

Based on the above description, the embodiments of the present application provide a method, an electronic apparatus, and a computer readable medium for processing reflection in an image. With the proposed method, the movements of the objects and lighting regions in the continuously captured images are compared. Accordingly, the lighting region moved slower than the nearby object is recognized as a reflection and can be removed from the image so as to improve the image quality.

In order to make the aforementioned and other features and advantages of the application comprehensible, several exemplary embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Figure 1:
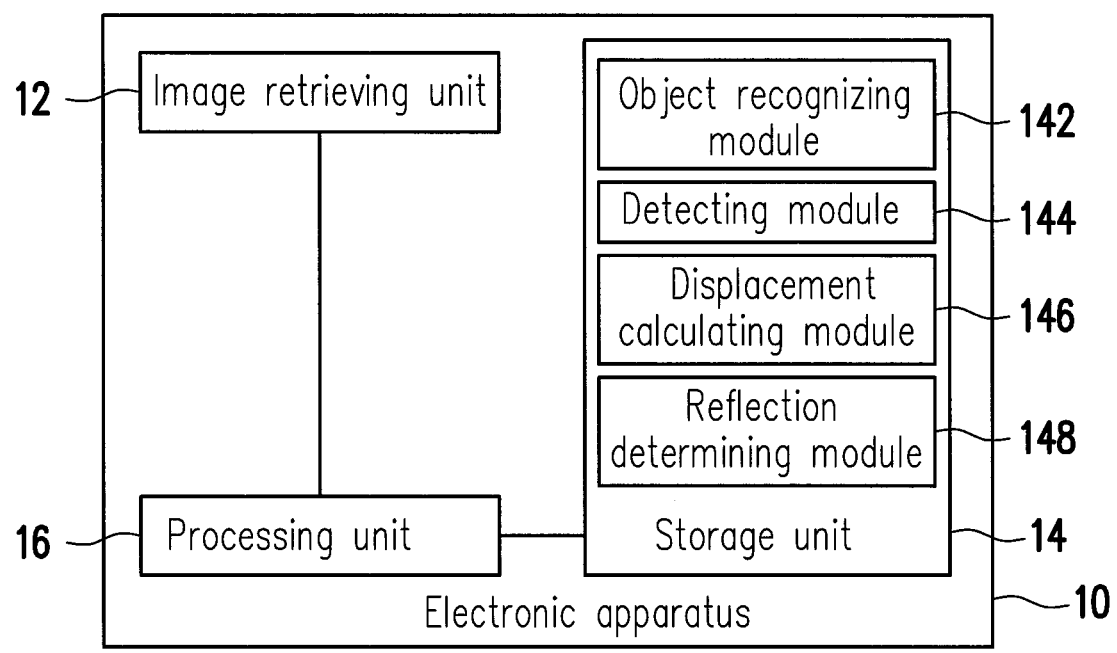
FIG. 1 is a schematic diagram of an electronic apparatus for processing reflection in an image according to an embodiment of the present application.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

The reflection of objects nearby a target to be captured, especially the reflection of objects with high brightness, is usually appeared on a glossy surface of the target and may cause the image being captured to include unnecessary content. Through moving the image capturing device, it is observed that the reflection in the captured images is moved slower than the nearby object. Accordingly, the present application takes use of this observation to develop an image processing method for automatically detecting the reflection appeared in the captured images and further removing the reflection through image inpainting. Embodiments of the present application are illustrated in detail below.

FIG. 1 is a schematic diagram of an electronic apparatus for processing reflection in an image according to an embodiment of the present application. In the present embodiment, the electronic apparatus 10 includes an image retrieving unit 12, a storage unit 14, and a processing unit 16. The electronic apparatus 10 is, for example, a portable electronic device, such as a camera, a smartphone, a personal digital assistant (PDA), a tablet or the like, and the application is not limited thereto.

The image retrieving unit 12 is, for example, a photosensitive element for capturing images such as a Charge Coupled Device (CCD), a Complementary Metal-Oxide Semiconductor (CMOS), or other elements, and the application is not limited thereto. The image retrieving unit 12 is used for obtaining images.

The storage unit 14 is, for example, one or a combination of a stationary or portable random access memory (RAM), read-only memory (ROM), flash memory, hard disk, or any other similar device, and which records a plurality of modules that can be executed by the processing unit 16. These modules include an object recognizing module 142, a detecting module 144, a displacement calculating module 146, and a reflection determining module 148, and those modules can be loaded into the processing unit 16 to perform a method for processing reflection in an image.

The processing unit 16 is, for example, a Central Processing Unit (CPU), a programmable microprocessor, a programmable controller, a Digital Signal Processor (DSP), an Application Specific Integrated Circuit (ASIC), a Programmable Logic Device (PLD), or other devices, and is coupled to the image retrieving unit 12 and the storage unit 14, for processing the reflection in an image obtained by the image retrieving unit 12.

Figure 2:
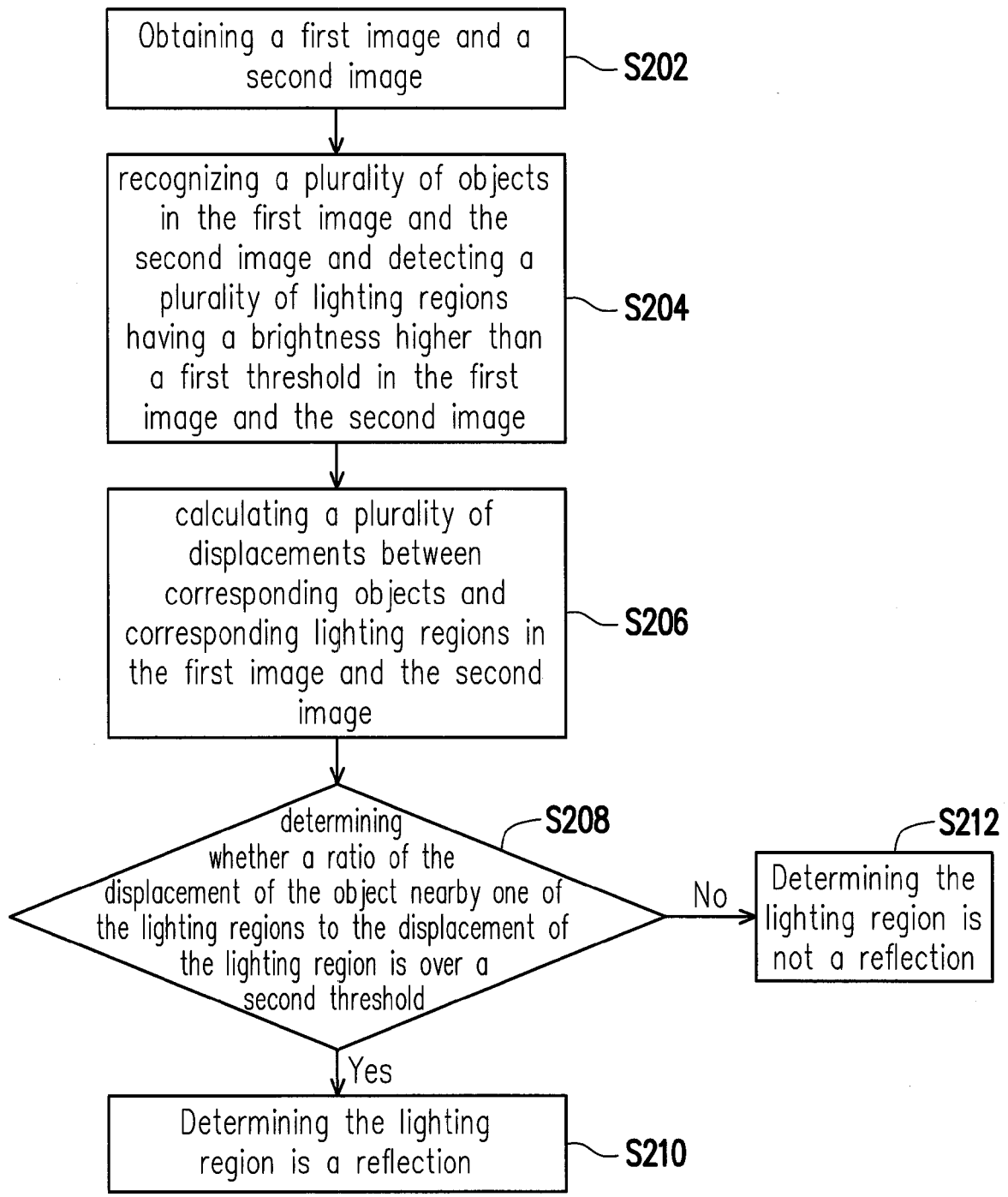
FIG. 2 is a flowchart illustrating a method for processing reflection in an image according to an embodiment of the present application.

Specifically, FIG. 2 is a flowchart illustrating a method for processing reflection in an image according to an embodiment of the present application. Referring to FIG. 1 and FIG. 2, the method of this embodiment is applicable to the electronic apparatus 10 in FIG. 1, and is used to process the reflection in an image obtained by the image retrieving unit 12. The process of the method of this embodiment is described in detail below with the elements of the electronic apparatus 10 in FIG. 1.

First, in step S202, the processing unit 16 may control the electronic apparatus 10 to obtain a first image and a second image by using the image retrieving unit 12. The images being obtained by the image retrieving unit 12 may be preview images and are displayed on a screen (not shown) of the electronic apparatus 10, so as to assist the user in finding a view for photographing.

In step S204, the object recognizing module 142 may recognize a plurality of objects in the first image and the second image, and the detecting module 144 may detect a plurality of lighting regions having a brightness higher than a first threshold in the first image and the second image. In detail, the object recognizing module 142 may apply an object matching algorithm to the first image and the second image so as to recognize the matched objects based on appearance characteristics of the objects and the appearance characteristics comprise at least one of color, shape, and texture, which are not limited thereto.

On the other hand, since the reflection is usually generated from objects with high brightness, the detecting module 144 may detect the lighting regions in the images through determining whether the brightness of the object is higher than the first threshold. The first threshold may be 250 in grey level or other values close to the highest brightness value (e.g. 255 in grey level), but is not limited thereto. The lighting regions may be determined from the objects recognized by the object recognizing module 142 or determined based on the brightness of the pixels in the images, which is not limited thereto. In detail, the object recognizing module 142 may compare the brightness of the pixels in the first image and the second image to find the pixels having the brightness higher than the first threshold and gather the found pixels which are connected to each other to form the lighting region.

In step S206, the displacement calculating module 146 calculates a plurality of displacements between corresponding objects and corresponding lighting regions in the first image and the second image. In step S208, the reflection determining module 148 determines whether a ratio of the displacement of the object nearby one of the lighting regions to the displacement of the lighting region is over a second threshold. The second threshold is, for example, a value of 2 or other values determined according to the circumstance or detection sensitivity required by the user, which is not limited in the present embodiment. In step S210, if the ratio is determined to be over the second threshold, the reflection determining module 148 may determine the lighting region having the ratio is a reflection. On the contrary, in step S212, if the ratio is determined to be not over the second threshold, the reflection determining module 148 may determine the lighting region having the ratio is not a reflection.

Figure 3:
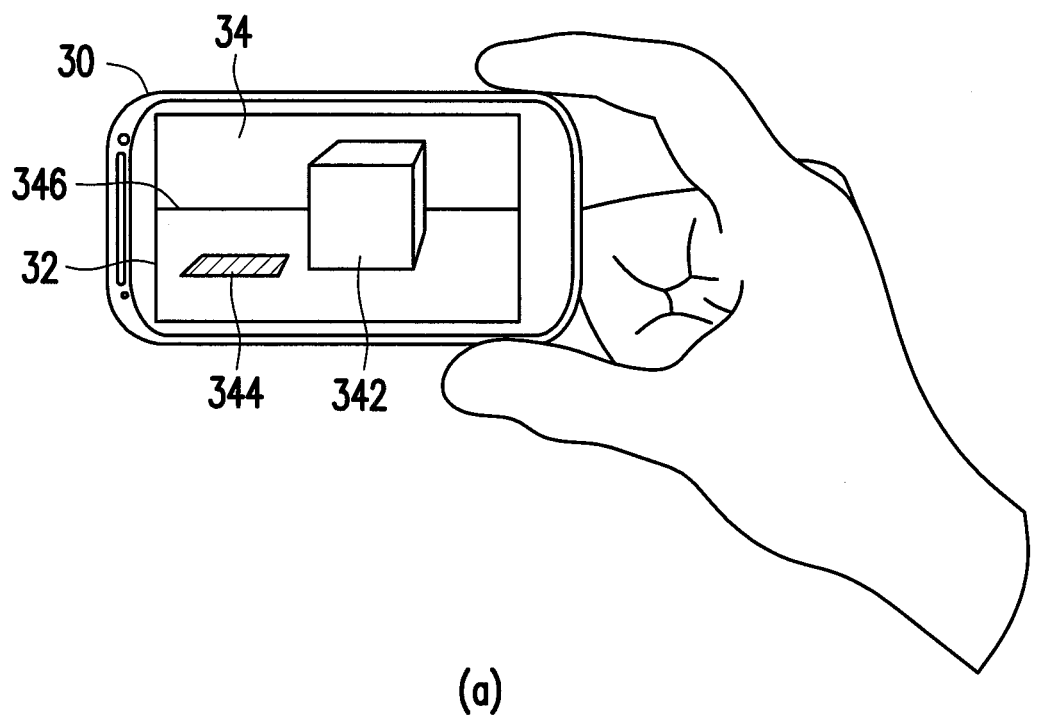
FIG. 3(a) and FIG. 3(b) illustrate an embodiment of recognizing reflection in an image according to an embodiment of the present application.
Figure 3:
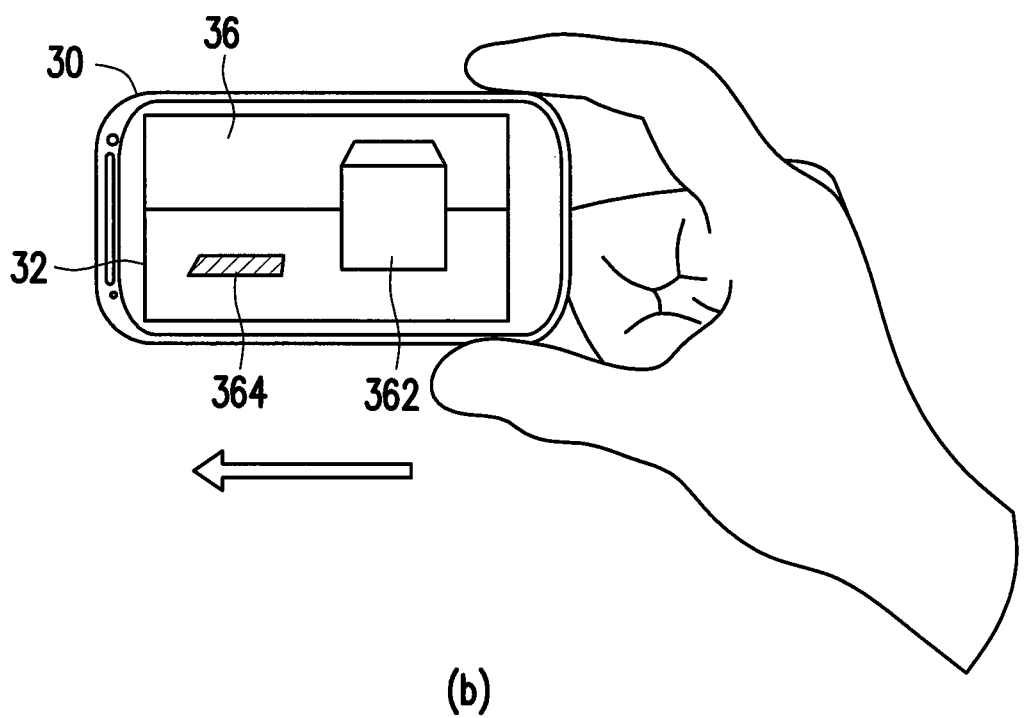

For example, FIG. 3(a) and FIG. 3(b) illustrate an example of recognizing reflection in an image according to an embodiment of the present application.

Referring to FIG. 3(a), it is assumed that the scene to be captured is a box placed on a glossy table. When a user uses a smartphone 30 to take pictures of the box, an image 34 is captured and displayed on a screen 32 of the smartphone 30. In the captured image 34, the box 342 on the table 346 is the object nearby the lighting region 344, which is generated from a fluorescent light. Referring to FIG. 3(b), when the user moves the smartphone 30 to the left, the objects (i.e. the box 342 and the lighting region 344) in the captured image 34 are moved accordingly. As shown in FIG. 3(b), in the captured image 36, the box 362 is turned from a side view to a front view and moved to the right. The lighting region 364 is also moved to the right, but a displacement thereof is less than the displacement of the box 362.

Figure 4:
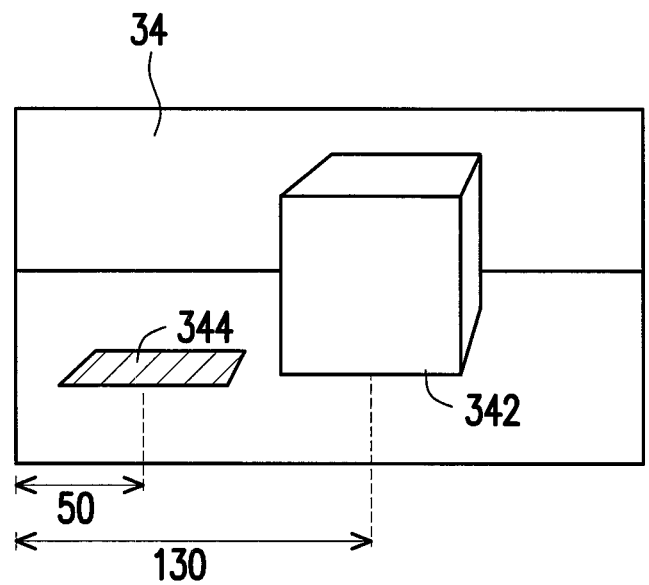
FIG. 4(a) and FIG. 4(b) illustrate a comparison between the images captured by the smartphone according to an embodiment of the present application.
Figure 4:
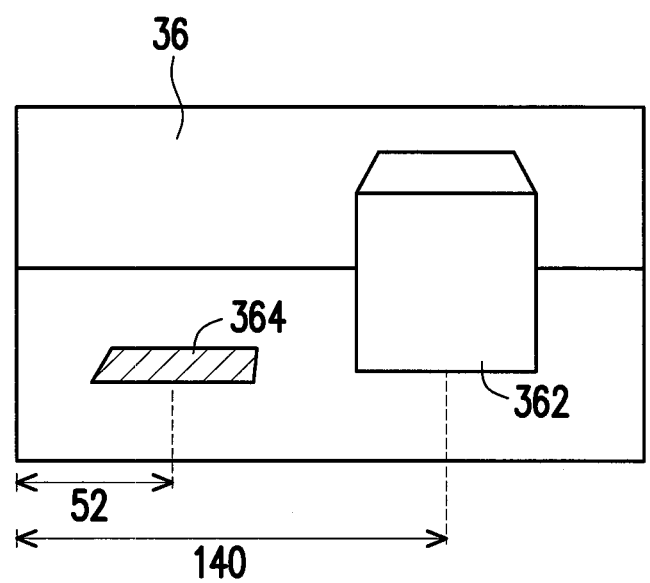

To be specific, FIG. 4(a) and FIG. 4(b) illustrate a comparison between the images captured by the smartphone 30 according to an embodiment of the present application. Referring to both FIG. 4(a) and FIG. 4(b), the present embodiment calculates the displacement between the boxes 342 and 362 and the displacement between the lighting regions 344 and 364. In the image 34, the box 342 is located 130 pixels away from the left edge of the image 34 and the lighting region 344 is located 50 pixels away from the left edge of the image 34. In the image 36, the box 362 is located 140 pixels away from the left edge of the image 36 and the lighting region 364 is located 52 pixels away from the left edge of the image 36. Therefore, the displacement $x_1$ of the box is equal to 10 (i.e. $x_1=140-130=10$) pixels and the displacement $x_2$ of the lighting region is equal to 2 (i.e. $x_2=52-50=2$) pixels. The ratio r of the displacement $x_1$ to $x_2$ is 5 (i.e. $r=x_1/x_2=10/2=5$) and compared with a threshold (e.g. 2). Since the ratio r is determined as being over the threshold, the lighting region 364 is finally determined as a reflection.

Through aforesaid method, the reflection in the images obtained by the image retrieving unit 12 can be effectively recognized and a message may be prompted to assist the user in adjusting an angle for capturing images. It is noted that, in another embodiment, an image inpainting algorithm may be further adopted to remove the reflection recognized in the foregoing embodiment.

In detail, after the reflection determining module 148 determines which object is the reflection in the step S210 in aforesaid embodiment, a reflection processing module (not shown) stored in the storage unit 14 may be further executed by the processing unit 16 to remove the reflection from the image and inpaints a removed region of the image with other images by means of image inpainting. To be specific, when the reflection is removed from the image, the removed region is emptied and may not be recovered. However, since the electronic apparatus 10 may be moved when detecting the reflection, a plurality of images are captured and those images may contain the missing portion originally blocked by the reflection. Therefore, through the technique of image inpainting, the removed region of the image can be recovered by other images obtained by the image retrieving unit 12.

Further, in case that the removed region of the image is not able to be recovered with other images, an indicator indicating a moving direction of the electronic apparatus 10 may be prompted to guide the user to move the electronic apparatus 10. In detail, when inpainting the removed region, the reflection processing module may further determine whether the removed region of the image is able to be recovered with other images. If the removed region of the image is not able to be recovered with other images, the reflection processing module may further estimate a moving direction of the electronic apparatus 10 that may obtain the images required to recover the removed region and indicate the moving direction on the screen of the electronic apparatus 10. As a result, the user is able to remove the reflection and simultaneously recover the removed region so as to obtain an image without reflection.

It is noted that, through the technique of image inpainting, the removed region of the image may be recovered by neighboring regions. In detail, the reflection removing module may inpaint the removed region of the image with neighboring regions of the removed region in the image by means of image inpainting. As a result, an image without reflection can also be obtained.

The application provides a non-transitory computer readable medium, which records a computer program to be loaded into an electronic apparatus to execute the steps of the aforementioned method for processing reflection in an image. The computer program is composed of a plurality of program instructions (for example, an organization chart establishing program instruction, a table approving program instruction, a setting program instruction, and a deployment program instruction, etc), and these program instructions are loaded into the electronic apparatus and executed by the same to accomplish various steps of the method for processing reflection in an image.

To sum up, the embodiments of the present application provide a method, an electronic apparatus, and a computer readable medium for processing reflection in an image. With the proposed method, the reflection in the images obtained by the electronic apparatus can be recognized through comparing the displacements of the lighting region and its nearby object in the images. The recognized reflection can be further removed and the removed region can be inpainted with other images or neighboring regions through image inpainting. As a result, an image without reflection can be obtained and a better image quality is achieved.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A method for processing reflection in an image, adapted for an electronic apparatus, comprising:
   obtaining a first image and a second image;
   recognizing a plurality of objects in the first image and the second image and detecting a plurality of lighting regions having a brightness higher than a first threshold in the first image and the second image;
   calculating a plurality of displacements between corresponding objects and corresponding lighting regions in the first image and the second image;
   determining whether a ratio of the displacement of the object nearby one of the lighting regions to the displacement of the lighting region is over a second threshold; and
   determining the lighting region is a reflection if the ratio is over the second threshold.

2. The method as claimed in claim 1, wherein the electronic apparatus further comprises an image retrieving unit, and the step of obtaining the first image and the second image comprises:
   capturing the first image and the second image by using the image retrieving unit.

3. The method as claimed in claim 1, wherein the step of recognizing the plurality of objects in the first image and the second image comprises:
   applying an object matching algorithm to the first image and the second image to recognize the matched objects based on appearance characteristics of the objects and the appearance characteristics comprise at least one of color, shape, and texture.

4. The method as claimed in claim 1, wherein after the step of determining the lighting region is the reflection if the ratio is over the second threshold, the method further comprises:
   removing the reflection from the first image and the second image and inpainting a removed region of the first image and the second image with other images by means of image inpainting.

5. The method as claimed in claim 4, wherein the step of removing the reflection from the first image and the second image and inpainting the removed region of the first image and the second image with other images by means of image inpainting further comprises:
   determining whether the removed region of the first image and the second image is able to be recovered with other images; and
   indicating a moving direction of the electronic apparatus to obtain the images required to recover the removed region if the removed region of the first image and the second image is not able to be recovered with other images.

6. The method as claimed in claim 1, wherein after the step of determining the lighting region is the reflection if the ratio is over the second threshold, the method further comprises:

removing the reflection from the first image and the second image and inpainting a removed region of the first image and the second image with neighboring regions of the removed region in the first image and the second image by means of image inpainting.

7. An electronic apparatus for processing reflection in an image, comprising:
   an photosensitive element, obtaining a first image and a second image;
   a non-transitory computer storage medium, storing information comprising program routines; and
   a processor, coupled to the photosensitive element and the non-transitory computer storage medium, for executing the program routines for:
      recognizing a plurality of objects in the first image and the second image;
      detecting a plurality of lighting regions having a brightness higher than a first threshold in the first image and the second image;
      calculating a plurality of displacements between corresponding objects and corresponding lighting regions in the first image and the second image; and
      determining whether a ratio of the displacement of the object nearby one of the lighting regions to the displacement of the lighting region is over a second threshold and determining the lighting region is a reflection if the ratio is over the second threshold.

8. The electronic apparatus as claimed in claim 7, wherein the photosensitive element is an image capturing device for capturing the first image and the second image.

9. The electronic apparatus as claimed in claim 7, wherein the processor applies an object matching algorithm to the first image and the second image to recognize the matched objects based on appearance characteristics of the objects and the appearance characteristics comprise at least one of color, shape, and texture.

10. The electronic apparatus as claimed in claim 7, wherein the processor further:
   removes the reflection from the first image and the second image and inpainting a removed region of the first image and the second image with other images by means of image inpainting.

11. The electronic apparatus as claimed in claim 7, wherein the processor determines whether the removed region of the first image and the second image is able to be recovered with other images, and indicates a moving direction of the electronic apparatus to obtain the images required to recover the removed region if the removed region of the first image and the second image is not able to be recovered with other images.

12. The electronic apparatus as claimed in claim 7, wherein the processor further:
   removes the reflection from the first age and the second image and inpainting a removed region of the first image and the second image with neighboring regions of the removed region in the first image and the second image by means of image inpainting.

13. A non-transitory computer readable medium, recording program instructions for:
   obtaining a first image and a second image;
   recognizing a plurality of objects in the first image and the second image and detecting a plurality of lighting regions having a brightness higher than a first threshold in the first image and the second image;
   calculating a plurality of displacements between corresponding objects and corresponding lighting regions in the first image and the second image;
   determining whether a ratio of the displacement of the object nearby one of the lighting regions to the displacement of the lighting region is over a second threshold; and
   determining the lighting region is a reflection if the ratio is over the second threshold.

\* \* \* \* \*